United States Patent [19]
Cucinotta et al.

[11] Patent Number: 6,081,792
[45] Date of Patent: Jun. 27, 2000

[54] ATM AND POS TERMINAL AND METHOD OF USE THEREOF

[75] Inventors: Robert P. Cucinotta, Los Gatos; Karim Maskatiya, Atherton, both of Calif.

[73] Assignee: USA Payment, Inc., Sunnyvale, Calif.

[21] Appl. No.: 09/007,740

[22] Filed: Jan. 15, 1998

[51] Int. Cl.[7] ...................................................... G06F 17/60
[52] U.S. Cl. .............................. 705/43; 235/379; 235/380
[58] Field of Search .................................. 705/38, 39, 42, 705/43; 235/379, 380; 902/24, 25, 39, 40

[56] References Cited

U.S. PATENT DOCUMENTS

| | | | |
|---|---|---|---|
| 4,390,968 | 6/1983 | Hennessy et al. | 380/24 |
| 4,567,358 | 1/1986 | Takamatsu et al. | 235/379 |
| 5,025,373 | 6/1991 | Keyser, Jr. et al. | 380/24 |
| 5,157,717 | 10/1992 | Hitchcock | 705/42 |
| 5,223,699 | 6/1993 | Flynn et al. | 235/380 |
| 5,285,382 | 2/1994 | Muehlberger et al. | 705/17 |
| 5,326,960 | 7/1994 | Tannenbaum | 235/379 |
| 5,350,906 | 9/1994 | Brody et al. | 235/379 |
| 5,386,104 | 1/1995 | Sime | 235/379 |
| 5,477,038 | 12/1995 | Levine et al. | 235/380 |
| 5,897,625 | 4/1999 | Gustin et al. | 705/43 |

OTHER PUBLICATIONS

Hogan, Barbara, kiosk supplies gamblers with 'QuickCash', Bank Systems & Technology v36n4 pp: 22, Apr. 1999.

*Primary Examiner*—Eric W. Stamber
*Assistant Examiner*—Hani M. Kazimi
*Attorney, Agent, or Firm*—Townsend and Townsend and Crew LLP

[57] ABSTRACT

A method of providing money, goods, services or the like to an account-holder based on an account when the daily ATM limit set by a bank has been met, or when a debit or credit card PIN cannot be remembered. The process will enable one to access cash and items of value through either the ATM network or a point-of-sale network to thereby obtain cash or an item of value. If the account-holder has exceeded the ATM network limit, a processor may prompt the account-holder to determine if the account-holder would like to access the account through the point-of-sale network. The money or item of value will be disbursed to the account-holder at a third location, where precautionary security measures may be utilized to ensure that the person receiving the cash is indeed the proper account-holder.

9 Claims, 2 Drawing Sheets

ATM AND POS TERMINAL AND METHOD OF USE THEREOF

BACKGROUND OF THE INVENTION

1. Technical Field

The present invention relates to an automated teller machine (ATM), and more particularly an automated teller machine that allows one to obtain cash from an account via various processes such as an ATM process or a point-of-sale process, with both debit cards and credit cards.

2. Description of the Prior Art

In today's society, there are many ways in which to purchase goods and services. The most common way is with cash. Cash is almost always accepted since it is a bearer instrument. Other common methods include checks, credit cards, and electronic fund transactions (EFTs) that utilize debit or ATM cards. Often, in order to prevent fraud, a person utilizing a check or credit card must present some form of identification. Additionally, with EFTs, a personal identification number or PIN is required. Accordingly, some places insist upon payment in cash.

Convenience sometimes dictates the method of payment. Sometimes it is simply inconvenient or impossible to utilize a check, credit card or debit card in various situations; for example, in casinos, nightclubs or bars where one is not running a "tab", or simply when an establishment is not equipped to handle credit cards and EFTs. Likewise, many establishments do not wish to bother with the risks associated with accepting checks, even with proper authentication and identification.

Since cash is so desirable, automated teller machines or ATMs have become extremely commonplace. At ATMs, one inserts an ATM or debit card into the machine, enters a PIN, and selects an amount of cash. The cash is then disbursed by the machine, provided there is enough cash within the person's account. However, banks have established preset limits, which often are $300 a day, and accordingly if one needs more than the limit or has already exceeded the limit, they will be unable to obtain more cash until the next day.

Often when one purchases items or services via an EFT with a debit or ATM card, the money is debited from the person's account as a point-of-sale transaction. The banks set different limits for point-of-sale transactions versus ATM limits. Accordingly, one can reach their ATM limit and not be able to obtain more cash that day from an ATM, but will still be able to purchase goods and services via a point-of-sale transaction because of the distinct and separate limit for point-of-sale transactions.

With a credit card, one can make a point-of-sale transaction for the purchase of goods and services. Additionally, one can obtain cash advances either in person or via an ATM with the credit card. However, credit cards also have PINs and if one does not regularly utilize a credit card for obtaining cash advances, one will have difficulty remembering their PIN. Since it is not wise to carry copies of your PIN on your person in case of theft, if one does not remember their PIN, one will be unable to obtain cash from an ATM with a credit card.

Accordingly, a method and apparatus for obtaining cash from one's account when their daily ATM limit has been reached, or for obtaining cash when one cannot remember their credit card PIN, is needed.

SUMMARY OF THE INVENTION

A terminal for and method of providing money to an account-holder from a selected account in accordance with the present invention addresses the shortcomings of the prior art.

In accordance with one aspect of the present invention, a method of providing money or an item of value to an account-holder based on an account includes identifying the account to a terminal, entering a personal identification number into the terminal, requesting money from the account via a first type of transaction, forwarding the first type of transaction to a processor, forwarding the first type of transaction from the processor to a first network, forwarding the first type of transaction from the first network to a bank, making a denial of the first type of transaction, forwarding the denial to the processor, requesting money from the account via a second type of transaction, forwarding the second type of transaction to the processor, forwarding the second type of transaction from the processor to a second network, forwarding the second type of transaction from the second network to the bank, making an approval of the second type of transaction, forwarding the approval to the processor, and instructing a money location to provide money to the account-holder.

In accordance with one aspect of the present invention, the account-holder is issued a script by the terminal upon approval of the second type of transaction.

In accordance with another aspect of the present invention, the method further includes instructing the account-holder at the terminal to go to the money location.

In accordance with yet another aspect of the present invention, the method further includes providing the money at the money location via a check or other negotiable instrument, imprinting the card on the check, and keeping a copy of the check at the money location.

In accordance with another aspect of the present invention, the method further includes providing money at the money location to the account-holder in the form of cash.

In accordance with yet another aspect of the present invention, the first network is an ATM network and the second network is a point-of-sale network.

In accordance with a further aspect of the present invention, the ATM network and point-of-sale network are integral.

In accordance with one aspect of the present invention, a terminal for providing cash to an account-holder from an account, with or without using a personal identification number, comprises apparatus for receiving a card identifying the account, apparatus for entering information, apparatus for communicating with ATM networks and point-of-sale networks, and apparatus for dispensing cash.

In accordance with another aspect of the present invention, a method of providing money or an item of value to an account-holder based on a bank account or a credit card account without using a personal identification number comprises identifying the account to a terminal, making a request for money, forwarding the request to a processor, forwarding the request from the processor to a point-of-sale network, forwarding the request from the point-of-sale network to the bank, making an approval of the request, forwarding the approval to the processor, and instructing a money location to provide money to the account-holder.

In accordance with one aspect of the present invention, a method of paying, on behalf of a person, for an item of value from an account of the person held by a custodian of the account includes identifying the account to a terminal, requesting the item from the account via a first type of transaction, forwarding the first type of transaction to a processor, forwarding the first type of transaction from the processor to a first network, forwarding the first type of transaction from the first network to the custodian of the account, making a denial of the first type of transaction, forwarding the denial to the processor, requesting the item from the account via a second type of transaction, forwarding the second type of transaction to the processor, forwarding the second type of transaction from the processor to a second network, forwarding the second type of transaction from the second network to the custodian of the account, making an approval of the second type of transaction, forwarding the approval to the processor, instructing the person to contact a dispenser, and instructing the dispenser to provide the person with the item of value.

In accordance with another aspect of the present invention, a method of paying, on behalf of a person, for an item of value from a credit card account without using a personal identification number comprises inserting a credit card into a terminal, making a request for the item, forwarding the request to a processor, forwarding the request from the processor to a point-of-sale network, forwarding the request from the point-of-sale network to an institution that issued the credit card, making an approval of the request, forwarding the approval to the processor, and instructing a dispenser to provide the item to the account-holder.

Accordingly, a terminal and a method in accordance with the present invention enable one to obtain money from a bank account via either an ATM network or a point-of-sale network. Additionally, money can be obtained with a credit card or debit card without utilizing a personal identification number. With the present invention, if one forgets their PIN, they will still be able to obtain a cash advance with a credit card. Additionally, if one reaches their ATM limit, more cash may be obtained via the point-of-sale network.

Other features and advantages of the present invention will be understood upon reading and understanding the detailed description of the preferred exemplary embodiments, found hereinbelow, in conjunction with reference to the drawings, in which like numerals represent like elements.

DETAILED DESCRIPTION OF THE PREFERRED EXEMPLARY EMBODIMENTS

Figure 1:
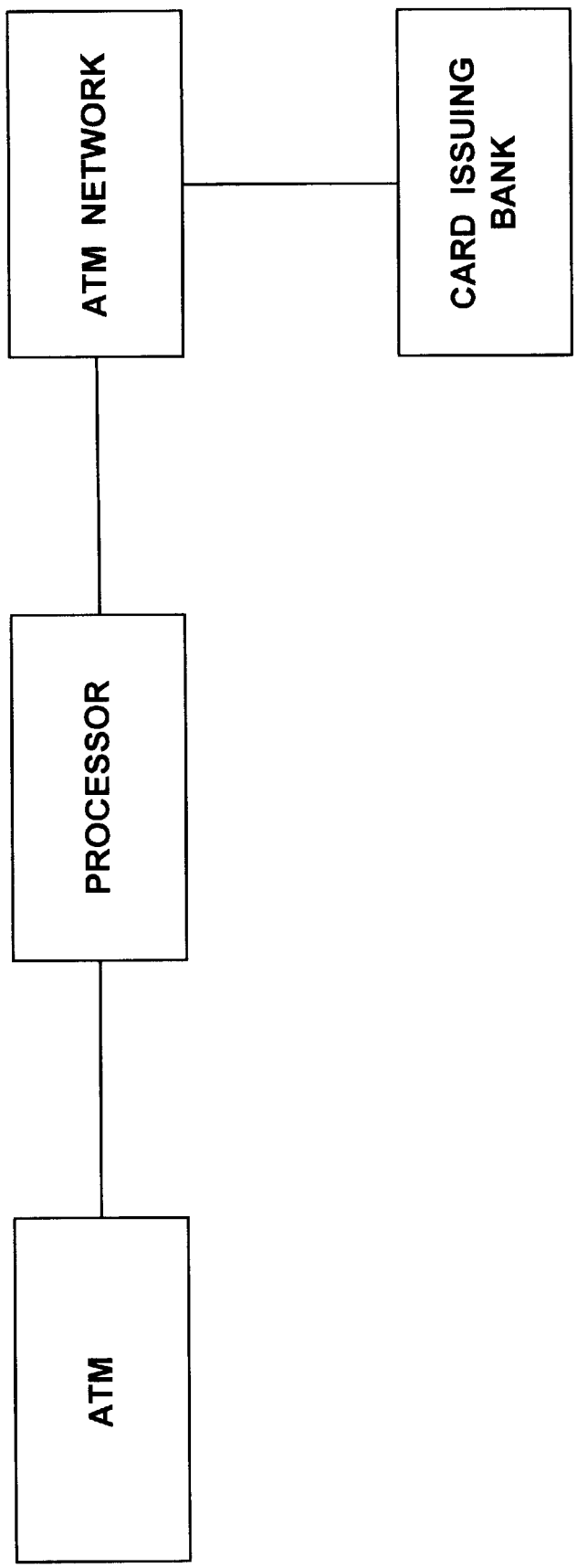
FIG. 1 is a schematic illustrating a flow diagram for obtaining cash from an account via an ATM.

Referring to FIG. 1, a process for obtaining cash via an automated teller machine, commonly referred to as an ATM, is illustrated. This process is well known in the art and generally involves an account-holder going to an ATM 10 in order to request cash, which is to be withdrawn from the account-holder's account. The account-holder inserts an ATM or debit card into the ATM, enters a personal identification number or PIN, and then performs other steps, including entering the amount of cash desired, based upon the prompts provided by the ATM. Generally, a typical ATM includes a screen for receiving and reading prompts from the ATM, at least one set of keys for entering information into the ATM, a slot for inserting the debit card, a port for receiving cash therefrom, and a port for inserting items such as an envelope for deposits. Some ATMs have a touch screen for entering information in conjunction with or in lieu of the set of keys.

Many ATMs will also accept credit cards in addition to accepting ATM or debit cards. The process is virtually identical in that the account-holder inserts the credit card and enters a PIN. Various prompts and information entering by the account-holder takes place and, eventually, the account-holder may receive their cash.

The information, such as account number and PIN, along with the amount of cash requested, is transmitted by the ATM 10 to an entity referred to as a processor 11. The processor 11 processes the information and forwards it to the ATM network 12, which then in turn forwards it on to a bank 13, which issued the card to the account-holder. The bank will then determine whether or not the ATM 10 should dispense cash to the account-holder. Among the factors that determine whether the ATM should dispense the cash is whether or not there are sufficient funds within the account and whether or not the account-holder has already met his daily ATM limit. Most banks 13 have preset limits for the amount of cash that can be withdrawn at ATMs by account-holders. A common figure for such daily limits is $300.

If for some reason the bank determines that ATM 10 should not dispense the requested cash to the account-holder, bank 13 transmits the denial back through the network to the ATM.

Figure 2:
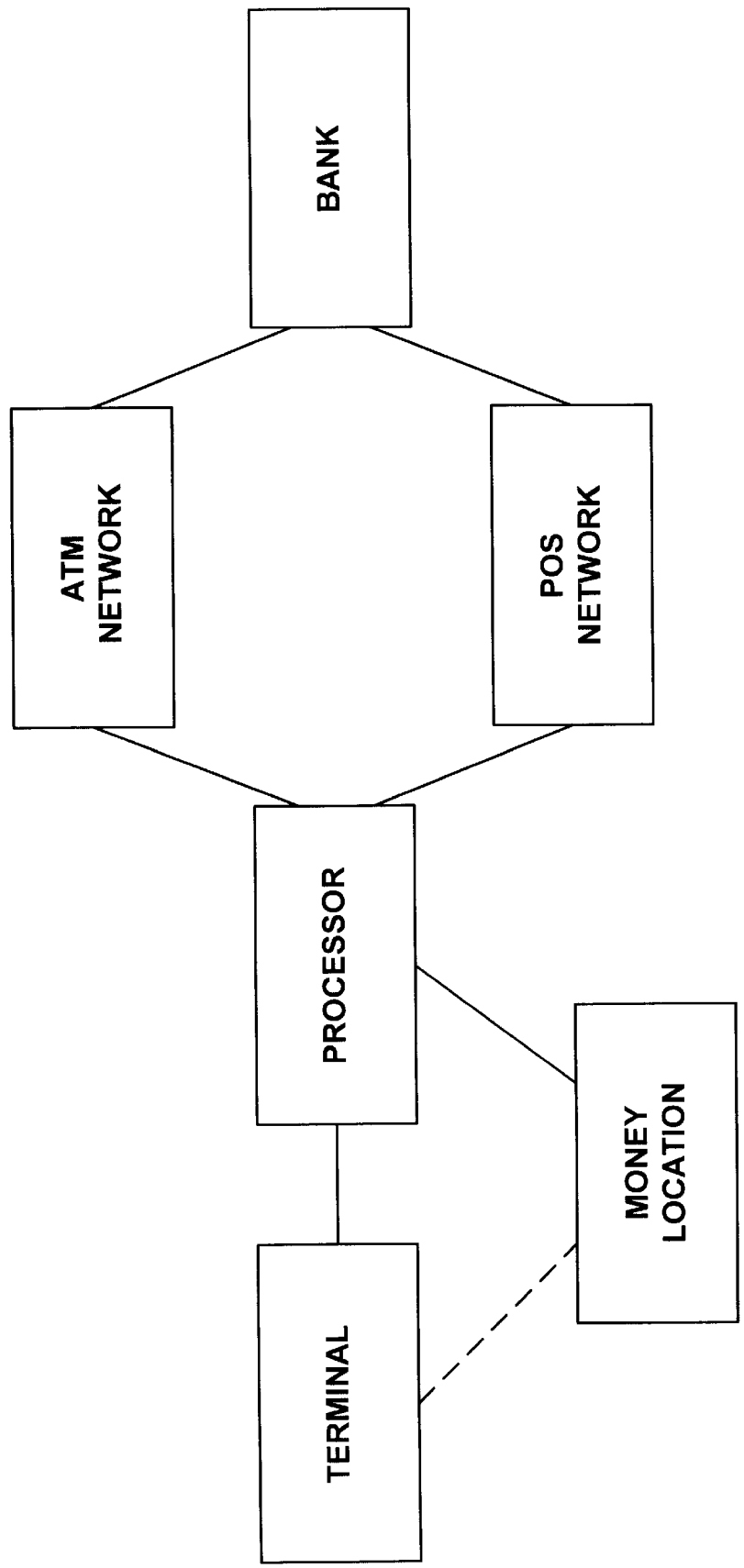
FIG. 2 is a schematic flow diagram illustrating a system of obtaining money via the present invention.

Turning to FIG. 2, a system for obtaining cash or an item of value such as tickets, tokens, entrance to an event or location, or the like, for example, via a process in accordance with the present invention can be explained. A terminal 20 is provided that generally corresponds to a standard ATM 10 that can handle requests for cash or items of value. Indeed, existing ATMs will be able to operate within the present inventive system. Accordingly, the terminal 20 will have at least some of the same general features such as a screen for providing prompts and information to a terminal user, keys or a keypad or a plurality of keypads, slots for inserting cards and/or slots for inputting a chip card or "chips", slots for making deposits, and slots for receiving cash. At a minimum, terminal 20 will need a way to communicate with a terminal user, whether it be with a screen, speaker, or printed paper, for example, and further will need the ability to receive information from the terminal user, such as keypads, a microphone, or the like, for example.

Terminal 20 will be in communication with processor 11, which once again will receive the request for cash or the like from the account-holder, along with information pertaining to the account-holder's account, the bank that carries the account, and the PIN. Processor 11 is in communication with ATM network 12, which in turn is in communication with bank 13.

Additionally, processor 11 is in communication with point-of-sale or POS network 21, which may utilize some or all of the communication lines utilized by the ATM network. POS network 21 is then in communication with bank 13. Indeed, ATM network 12 and POS network 13 may be integral and may be controlled by the same entity.

POS network 13 handles POS transactions wherein an account-holder buys goods or services and then requests the funds be transferred from their bank account in exchange or payment for the goods or services. Also, the POS network handles POS transactions wherein a credit card is utilized to purchase goods and services. Such transactions are commonly used at, for example, grocery stores, service stations, restaurants, theaters, amusement parks, and numerous other venues. As with the ATM network, banks generally set a daily limit on the amount of money that may be withdrawn from an account via POS transactions. This limit is generally different than an ATM limit. Similarly, credit cards have total credit limits, as opposed to daily limits, and often have separate total cash advance limits. However, some credit cards do have daily limits, especially daily cash advance limits.

With the present invention, an account-holder will approach terminal 20 and request cash or the like with an ATM/debit card or a credit card, generally via the traditional ATM network process. The process could begin by inserting a card, typing in information to identify the account, or swiping the card to read the magnetic strip. With the present invention, if the account-holder has reached their daily limit set by the bank, the rejection or denial for cash will preferably be displayed to the account-holder at terminal 20. Additionally, terminal 20 via processor 11 will preferably prompt the account-holder, asking if the account-holder would like to make the transaction a point-of-sale transaction, thereby presenting the account-holder with an opportunity to obtain cash via the POS network. If the account-holder so desires, the account-holder will then agree to convert the transaction to a POS transaction and can request the same amount of cash or can request a different amount of cash. The processor will then forward the money request to the POS network, which then forwards the request and appropriate information to bank 13. If the money is available within the account, in the case of ATM/debit cards, and the account-holder has not reached their daily preset limit for POS transactions, the bank will approve the POS transaction and inform the processor of the approval.

Alternatively, the inventive system can automatically convert the first transaction to a POS transaction, i.e. a "roll-over". If the account-holder has not reached their daily POS limit, the bank will inform the processor of the approval of the request as a POS transaction.

In the preferred embodiment, processor 11 will inform a money location 22 of the approved transaction. Preferably the processor will also inform the account-holder of the approval and to proceed to the money location 22. Alternatively, the account-holder will proceed to the money location and the money location will then inquire about or "pull-down" the transaction and approval thereof based on the account number by either manually entering the account number or by other means, such as reading a magnetic strip, entering part of the account number, entering a name, etc. Examples of money location 22 include, for example, cash windows or "cages" within casinos or racetracks, front desks or concierges of hotels, ticket booths, will-call windows or customer service windows at stadiums, coliseums, theaters, stores, or amusement parks.

Also, terminal 20 could issue a "script", which is a form of a "pre-receipt". The script may indicate information about the transaction and entitle the account-holder to cash or an item of value upon presentation at money location 22.

At money location 22, cash, negotiable instruments, or items of value such as, for example, tickets, gambling tokens, arcade tokens, etc. will be provided to the account-holder, preferably upon presentation of proper identification such as a driver's license. Accordingly, money location 22 can act as a "dispenser".

In the preferred embodiment, processor 11 will approve the issuance of a check, drawn against the account-holder's account, at the money location, made out to the money location owner. Upon issuance of the check to the money location owner, the money location may imprint a copy of the ATM/POS/credit card onto the check, record driver's license information onto the check, and/or provide a copy of the imprinted check to the account-holder for their records. Money location 22 will then provide money or an item of value to the account-holder.

In many instances, an account-holder may utilize a credit card as opposed to a debit card. If the account-holder remembers their PIN, the request for cash from the credit card account (or an item of value paid for against the credit card account) will follow the standard ATM procedures. However, as is often the case, if the account-holder cannot recall their PIN, standard ATM networks will not authorize the ATM to dispense cash. With the present invention, the processor will route the request for cash from the credit card account without the PIN through the POS network to the bank. (Likewise, if one forgets their PIN associated with their ATM card, the processor will route the request for cash over the POS network.) If the credit card account credit limit (or ATM POS limit) has not been reached, the bank will approve the "cash advance" and the processor may so notify the money location. Once again the money location could inquire about the transaction as opposed to being informed about it. Also, a script could be issued to the account-holder. The processor preferably will then inform the account-holder via the terminal 20 to proceed to the money location, where the money or other instrument will be dispensed to the account-holder. A check will then be issued to the money location owner and proper forms of identification may be utilized to avoid fraud, i.e. imprinting the card on the check, recording driver's license information on the check, etc., yet the account-holder will not be burdened with remembering a seldom-used credit card PIN. A copy of the check will once again be given to the account-holder.

Obviously, other methods of providing the money to the money location owner could be utilized instead of issuing a check. For example, funds could be provided by the processor to the money location owner via EFT, or a negotiable instrument could be mailed or hand-delivered.

Also, the account-holder could utilize the present system to obtain an item of value such as goods and services from money locations that are automated devices such as turn-stiles for admittance to various locations and events, dispensing machines, ticket machines, etc. Upon approval at the automated device, the account-holder would simply insert their card in the automated device, swipe the card in the automated device, or have their card read at the automated device.

Accordingly, the present invention allows one to obtain cash or an item of value based on a bank account when the daily ATM limit has been exceeded and it is not possible to proceed to a bank outlet to obtain the needed cash. Additionally, the present invention will allow one to obtain needed cash or an item of value from a credit card account without the burden of remembering a rarely-used PIN. Additionally, the process allows for adequate security measures to prevent fraudulent use of ATM cards and credit cards.

Although the invention has been described with reference to specific exemplary embodiments, it will be appreciated that it is intended to cover all modifications and equivalents within the scope of the appended claims.

What is claimed is:

1. A method of providing money or an item of value to an account-holder, the method comprising:

identifying an account to a terminal;

entering a personal identification number into the terminal;

requesting money or an item of value based upon the account via a first type of transaction;

forwarding the first type of transaction to a processor;

forwarding the first type of transaction from the processor to a first network;

forwarding the first type of transaction from the first network to a bank;

making a denial of the first type of transaction due to exceeded pre-set limit;

forwarding the denial to the processor;

notifying the account-holder at the terminal of the denial of the first type of transaction, and asking the account-holder if they would like to request the money or item of value via a second type of transaction;

requesting money or an item of value based upon the account via a second type of transaction;

forwarding the second type of transaction to the processor;

forwarding the second type of transaction from the processor to a second network;

forwarding the second type of transaction from the second network to the bank;

making an approval of the second type of transaction;

forwarding the approval to the processor;

and instructing a money location separate from the terminal to provide money or an item of value to the account-holder.

2. The method of claim 1 further comprising instructing the account-holder at the terminal to go to the money location.

3. The method of claim 1 further comprising providing a check to the money location, imprinting one of an ATM card, a POS card or a credit card on the check, and providing a copy of the check to the account-holder at the money location.

4. The method of claim 1 further comprising providing cash at the money location to the account-holder.

5. The method of claim 1 wherein the first network is an ATM network and the second network is a point-of-sale network.

6. The method of claim 5 wherein the ATM network and the POS network are integral.

7. The method of claim 1 wherein the terminal issues a script to the account-holder and the account-holder presents the script to the money location.

8. The method of claim 1 wherein the money location inquires about the transaction from the processor in order to be instructed to provide money or an item of value to the account-holder.

9. A method of paying on behalf of a person for money or an item of value, from an account of the person held by a custodian of the account based on a bank account, the method comprising:

identifying the account to a terminal;

requesting the item from the account via a first type of transaction;

forwarding the first type of transaction to a processor;

forwarding the first type of transaction from the processor to a first network; forwarding the first type of transaction from the first network to the custodian of the account;

making a denial of the first type of transaction due to exceeded pre-set limit;

forwarding the denial to the processor;

notifying the person at the terminal of the denial of the first type of transaction, and asking the person if they would like to request the money or item of value via a second type of transaction;

requesting the item from the account via a second type of transaction;

forwarding the second type of transaction to the processor;

forwarding the second type of transaction from the processor to a second network;

forwarding the second type of transaction from the second network to the custodian of the account;

making an approval of the second type of transaction;

forwarding the approval to the processor; and instructing the person to contact a dispenser of the item of value other than the terminal and instructing the dispenser to provide the person with the item of value.

* * * * *